United States Patent
Numata et al.

(10) Patent No.: US 11,380,946 B2
(45) Date of Patent: Jul. 5, 2022

(54) COOLANT AND POWER STORAGE PACK USING SAME

(71) Applicants: SUMITOMO ELECTRIC INDUSTRIES, LTD., Osaka (JP); Sumitomo Wiring Systems, Ltd., Mie (JP); AutoNetworks Technologies, Ltd., Yokkaichi (JP)

(72) Inventors: Koma Numata, Osaka (JP); Masatoshi Majima, Osaka (JP); Kazuki Okuno, Osaka (JP); Hiroki Hirai, Yokkaichi (JP); Tetsuji Tanaka, Yokkaichi (JP); Makoto Higashikozono, Yokkaichi (JP); Junichi Ono, Yokkaichi (JP)

(73) Assignees: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

( * ) Notice: Subject to any disclaimer, the term of this patent is extended or adjusted under 35 U.S.C. 154(b) by 218 days.

(21) Appl. No.: 16/769,440

(22) PCT Filed: Sep. 13, 2018

(86) PCT No.: PCT/JP2018/034012
§ 371 (c)(1),
(2) Date: Jun. 3, 2020

(87) PCT Pub. No.: WO2019/111488
PCT Pub. Date: Jun. 13, 2019

(65) Prior Publication Data
US 2020/0388890 A1    Dec. 10, 2020

(30) Foreign Application Priority Data

Dec. 8, 2017  (JP) .............................. JP2017-236187

(51) Int. Cl.
*H01M 10/613* (2014.01)
*H01M 10/6555* (2014.01)
(Continued)

(52) U.S. Cl.
CPC .......... *H01M 10/613* (2015.04); *F16L 59/02* (2013.01); *H01G 11/18* (2013.01); *H01G 11/58* (2013.01);
(Continued)

(58) Field of Classification Search
CPC .......... H01M 10/613; H01M 10/6555; H01M 10/6567; H01M 10/658; F16L 59/02; H01G 11/18; H01G 11/58
See application file for complete search history.

(56) References Cited

U.S. PATENT DOCUMENTS

| | | | |
|---|---|---|---|
| 2014/0113171 A1* | 4/2014 | Schaefer | ............... H01M 50/20 165/185 |
| 2016/0060808 A1 | 3/2016 | Oikawa et al. | |
| 2018/0242772 A1 | 8/2018 | Jenkins et al. | |

FOREIGN PATENT DOCUMENTS

| | | |
|---|---|---|
| JP | H11-023169 A | 1/1999 |
| JP | 2008-266586 A | 11/2008 |

(Continued)

*Primary Examiner* — Stewart A Fraser
(74) *Attorney, Agent, or Firm* — Faegre Drinker Biddle & Reath LLP

(57) ABSTRACT

A coolant includes a refrigerant, a porous plate-shaped heat insulator, and an enclosure in which the refrigerant and the heat insulator are enclosed in a sealed state, and the heat insulator has a thermal conductivity per unit area of 300 W/(K·m²) or less and a thickness equal to or greater than 0.5 mm and equal to or less than 10.0 mm.

11 Claims, 2 Drawing Sheets

(51) Int. Cl.
*H01M 10/6567* (2014.01)
*H01M 10/658* (2014.01)
*F16L 59/02* (2006.01)
*H01G 11/18* (2013.01)
*H01G 11/58* (2013.01)

(52) U.S. Cl.
CPC ..... *H01M 10/658* (2015.04); *H01M 10/6555* (2015.04); *H01M 10/6567* (2015.04)

(56) References Cited

FOREIGN PATENT DOCUMENTS

| | | |
|---|---|---|
| JP | 2010-211963 A | 9/2010 |
| JP | 2012-124319 A | 6/2012 |
| JP | 2012-155858 A | 8/2012 |
| JP | 2013-131428 A | 7/2013 |
| JP | 2016-047979 A | 4/2016 |
| JP | 2017-215014 A | 12/2017 |
| WO | WO-2017/094819 A1 | 6/2017 |

* cited by examiner

COOLANT AND POWER STORAGE PACK USING SAME

TECHNICAL FIELD

The present disclosure relates to a coolant and a power storage pack using the same.

This application claims priority on Japanese Patent Application No. 2017-236187 filed on Dec. 8, 2017, the entire contents of which are incorporated herein by reference.

BACKGROUND ART

An example of a coolant for cooling a heating element such as a unit battery cell or a battery module is a heat pipe. For example, PATENT LITERATURE 1 (Japanese Laid-Open Patent Publication No. H11-023169) discloses a coolant (heat pipe) having a structure in which a heat transfer fluid is enclosed in a liquid-tight manner inside a pipe made of a metal material.

As a method for dissipating heat from each unit battery cell in a battery pack, for example, PATENT LITERATURE 2 (Japanese Laid-Open Patent Publication No. 2012-155858) discloses providing each unit battery cell with a heat conductive member (heat transfer plate) that connects an electrolytic solution in the battery cell to a cooling system provided outside the battery cell.

Moreover, PATENT LITERATURE 3 (Japanese Laid-Open Patent Publication No. 2010-211963) discloses a power storage device including an absorption sheet that is in contact with the outer surface of a power storage element and that absorbs a liquid refrigerant capable of vaporizing upon receiving heat from the power storage element.

CITATION LIST

Patent Literature

PATENT LITERATURE 1: Japanese Laid-Open Patent Publication No. H11-023169
PATENT LITERATURE 2: Japanese Laid-Open Patent Publication No. 2012-155858
PATENT LITERATURE 3: Japanese Laid-Open Patent Publication No. 2010-211963

SUMMARY OF INVENTION

A coolant of the present disclosure includes a refrigerant, a porous plate-shaped heat insulator, and an enclosure in which the refrigerant and the heat insulator are enclosed in a sealed state, wherein the heat insulator has a thermal conductivity per unit area of 300 W/(K·m$^2$) or less and a thickness equal to or greater than 0.5 mm and equal to or less than 10.0 mm.

A power storage pack of the present disclosure is a power storage pack including a plurality of power storage modules, wherein each of the power storage modules includes a plurality of power storage cells, and the power storage pack comprises the coolant of the present disclosure at least between the plurality of power storage cells.

Another power storage pack of the present disclosure is a power storage pack including a plurality of power storage modules, wherein each of the power storage modules includes a plurality of power storage cells, and the power storage pack comprises the coolant of the present disclosure at least between the plurality of power storage modules.

DESCRIPTION OF EMBODIMENTS

Technical Problem

Figure 1:
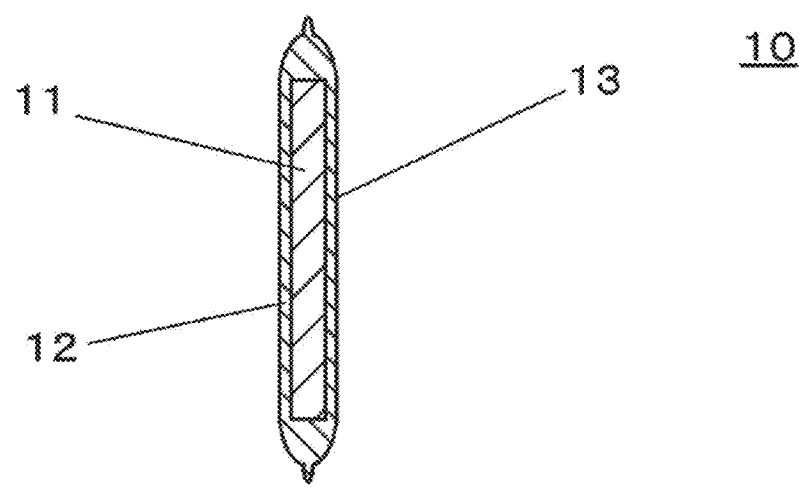
FIG. 1 is a diagram showing an outline of an example of a coolant according to an embodiment of the present disclosure.

A conventional heat radiating means is formed from a metal material having a high thermal conductivity, in order to efficiently dissipate heat in a normal use state.

However, when a material having a high thermal conductivity is used for a coolant, if a unit battery cell causes abnormal generation of heat for some reason in a battery pack, the heat is immediately transmitted through a heat conductive member to an adjacent unit battery cell.

Therefore, in view of the above-described problem, an object of the present disclosure is to provide a coolant that is capable of exhibiting cooling performance of cooling heating elements such as power storage cells or power storage modules in normal times and that is capable of, when a heating element has caused abnormal generation of heat, exhibiting heat insulation performance of making it difficult for the heat to be transmitted to an adjacent member.

Advantageous Effects of Disclosure

According to the present disclosure, it is possible to provide a coolant that is capable of exhibiting cooling performance of cooling heating elements such as power storage cells or power storage modules in normal times and that is capable of, when a heating element has caused abnormal generation of heat, exhibiting heat insulation performance of making it difficult for the heat to be transmitted to an adjacent member.

Furthermore, according to the present disclosure, it is possible to provide a power storage pack in which power storage cells or power storage modules in the power storage pack are cooled in normal times and in which, when a part of the power storage cells or power storage modules in the power storage pack has caused abnormal generation of heat, it is difficult for the heat to be transmitted to a nearby power storage cell or power storage module.

DESCRIPTION OF EMBODIMENTS

First, embodiments of the present disclosure will be listed and described.

(1) A coolant according to an embodiment of the present disclosure includes a refrigerant, a porous plate-shaped heat insulator, and an enclosure in which the refrigerant and the heat insulator are enclosed in a sealed state. The heat insulator has a thermal conductivity per unit area of 300

W/(K·m²) or less and a thickness equal to or greater than 0.5 mm and equal to or less than 10.0 mm.

According to the coolant described in the above (1), it is possible to provide a coolant that is capable of exhibiting cooling performance of cooling heating elements such as power storage cells or power storage modules in normal times and that is capable of, when a heating element has caused abnormal generation of heat, exhibiting heat insulation performance of making it difficult for the heat to be transmitted to an adjacent member.

In the present disclosure, the "thermal conductivity per unit area (W/(K·m²))" refers to a value obtained by dividing a thermal conductivity (W/(K·m)) inherent to a material by the thickness of the material.

(2) In the coolant described in the above (1), the thermal conductivity per unit area of the heat insulator is preferably equal to or less than 100 W/(K·m²).

(3) In the coolant described in the above (1) or (2), the thermal conductivity per unit area of the heat insulator is preferably equal to or less than 60 W/(K·m²).

According to the coolant described in the above (2) or (3), it is possible to provide a coolant capable of exhibiting more excellent heat insulation performance when a heating element such as a power storage cell or a power storage module has caused abnormal generation of heat.

(4) In the coolant described in any one of the above (1) to (3), the thickness of the heat insulator is preferably equal to or greater than 0.5 mm and equal to or less than 5.0 mm.

(5) In the coolant described in any one of the above (1) to (4), the thickness of the heat insulator is preferably equal to or greater than 0.5 mm and equal to or less than 2.0 mm.

According to the coolant described in the above (4) or (5), it is possible to provide a coolant that is capable of exhibiting more excellent heat insulation performance when a heating element such as a power storage cell or a power storage module has caused abnormal generation of heat and that contributes to a reduction in the size of a power storage pack.

(6) In the coolant described in any one of the above (1) to (5), the heat insulator is preferably a glass wool, a microbead porous body, or a nonwoven fabric.

According to the coolant described in the above (6), it is possible to provide a coolant that has a large amount of a refrigerant held therein and that is capable of exhibiting higher cooling performance in normal times.

(7) In the coolant described in the above (1), preferably, the heat insulator is a glass wool, the refrigerant is a fluorinated organic solvent, and the enclosure is composed of a sheet member containing aluminum or an aluminum alloy.

(8) A power storage pack according to an embodiment of the present disclosure is a power storage pack including a plurality of power storage modules, wherein each of the power storage modules includes a plurality of power storage cells, and the power storage pack includes the coolant described in any one of the above (1) to (7) at least between the plurality of power storage cells.

(9) A power storage pack according to another embodiment of the present disclosure is a power storage pack including a plurality of power storage modules, wherein each of the power storage modules includes a plurality of power storage cells, and the power storage pack includes the coolant described in any one of the above (1) to (7) at least between the plurality of power storage modules.

According to the power storage pack described in the above (8) or (9), it is possible to provide a power storage pack in which power storage cells or power storage modules in the power storage pack are cooled in normal times and in which, when a part of the power storage cells or power storage modules in the power storage pack has caused abnormal generation of heat, it is difficult for the heat to be transmitted to a nearby power storage cell or power storage module.

(10) In the power storage pack described in the above (8) or (9), the power storage cell preferably includes an organic electrolytic solution as an electrolytic solution.

According to the power storage pack described in the above (10), it is possible to provide a power storage pack that has a high energy density and includes an organic electrolytic solution and in which, even when a heating element such as a power storage cell or a power storage module has caused abnormal generation of heat, a coolant is capable of exhibiting heat insulation performance to make it difficult for the heat to be transmitted to another normal heating element. In addition, it is possible to provide a power storage pack that is capable of, even when a part of power storage cells or power storage modules in the power storage pack catches fire, increasing the time taken for the fire to spread to an adjacent power storage cell or power storage module.

Details of Embodiments

Hereinafter, specific examples of a coolant according to an embodiment of the present disclosure and a power storage pack using the coolant will be described in more detail. The present invention is not limited to these examples and is indicated by the claims, and is intended to include meaning equivalent to the claims and all modifications within the scope of the claims.

<Coolant>

FIG. 1 shows a schematic diagram of an example of a coolant according to an embodiment of the present disclosure. As shown in FIG. 1, a coolant 10 according to the embodiment of the present disclosure includes a refrigerant 12, a porous plate-shaped heat insulator 11, and an enclosure 13. The enclosure 13 is for enclosing the refrigerant 12 and the heat insulator 11 in a sealed state. In addition, the heat insulator 11 has a thermal conductivity per unit area of 300 W/(K·m²) or less and a thickness equal to or greater than 0.5 mm and equal to or less than 10.0 mm.

The coolant according to the embodiment of the present disclosure is disposed between heating elements such as power storage cells or power storage modules when being used. By using the coolant according to the embodiment of the present disclosure, the heating elements such as power storage cells and power storage modules can be cooled in normal times, and, when a heating element has become extremely hot due to an unexpected abnormality, heat insulation performance can be exhibited to make it difficult for the heat of the heating element, which has caused abnormal generation of heat, to be transmitted to another heating element.

More specifically, in a temperature range (about −40° C. to 70° C. (see NON PATENT LITERATURE 1)), which is a normal use state of the heating elements such as power storage cells and power storage modules, when the heat from a heating element is transmitted to the coolant 10, the heating element can be cooled by the latent heat of vaporization generated when the refrigerant 12 vaporizes from liquid to gas within the coolant 10. When the refrigerant 12 vaporizes, the internal pressure of the enclosure 13 rises, and a part of the enclosure 13 other than a portion interposed between the heating elements becomes deformed so as to expand to form a bulging portion. Expansion of the portion, of the enclosure, interposed between the heating elements is restricted and thus this portion does not become deformed. When the refrigerant 12 is cooled to condense, the internal pressure of the enclosure 13 decreases and the bulging portion disappears.

[Non Patent Literature 1]

"Automotive parts—Test methods and general performance requirements for wiring harness connectors", JASO Automotive Standards, the Society of Automotive Engineers of Japan, Inc., JASO D616: 2011

Meanwhile, when the heating element has caused an abnormality for some reason and has reached a high temperature of about 450° C., the enclosure 13 cannot withstand the volume expansion due to vaporization of the refrigerant 12, so that the enclosure 13 becomes opened. Then, the refrigerant 12 comes out of the enclosure 13, and the heat insulator 11 is left within the enclosure 13. Thus, the heat insulator 11 having high heat insulation properties is interposed between the heating element that has caused abnormal generation of heat and a surrounding normal heating element, so that the speed at which the heat of the heating element that has caused abnormal generation of heat is transmitted to the surrounding heating element can be decreased.

Hereinafter, each component of the coolant according to the embodiment of the present disclosure will be described in detail.

(Refrigerant)

The refrigerant 12 changes its state between liquid and gas. As the refrigerant 12, for example, one or more members selected from the group consisting of fluorinated organic solvents such as perfluorocarbons, hydrofluoroethers, hydrofluoroketones, and fluorine inert liquids, water, and alcohols such as methanol and ethanol, can be used. The refrigerant 12 may have electrical insulation properties, or may have electrical conduction properties. The amount of the refrigerant 12 enclosed in the enclosure 13 can be appropriately selected as necessary.

(Heat Insulator)

The heat insulator 11 has a plate shape and typically has a substantially rectangular shape. The heat insulator 11 only has to be formed from a porous material such that the heat insulator 11 can absorb the refrigerant 12. Examples of the material that can be used as the heat insulator 11 include a woven or nonwoven fabric formed from a material processed into a fiber form, and a material obtained by sintering particles. The material that forms the heat insulator 11 may be natural fibers, synthetic fibers formed from a synthetic resin, or a material using both natural fibers and synthetic fibers.

As the heat insulator 11, a glass wool, a microbead porous body, or a nonwoven fabric is preferably used.

Examples of the glass wool include a glass wool obtained by gathering glass fibers into a cottony form and a glass wool obtained by mixing and molding glass fibers with a binder. From the viewpoint of stability of thickness and prevention of falling-off of glass fibers, the glass wool is preferably a glass wool molded into a sheet shape using a binder. The higher the density of the glass wool is, the higher the heat insulation properties are. Thus, a glass wool having a high density is preferably used. The density of the glass wool is preferably equal to or greater than $1.5$ kg/m$^3$, more preferably equal to or greater than $2$ kg/m$^3$, and further preferably equal to or greater than $2.2$ kg/m$^3$.

An example of the microbead porous body is a porous body obtained by sintering spherical particles of about 1 μm to 10 μm and molding the particles into a sheet shape. Examples of the material of the microbead porous body include polymers such as polyamide imide and polyimide, and glass.

Examples of the nonwoven fabric include a fiber sheet, a web (a thin film-like sheet composed of only fibers), and a bat (a blanket-like fiber).

In general, in a state where a heating element (for example, a lithium-ion battery) such as a power storage cell or a power storage module is causing abnormal generation of heat to catch fire, the temperature reaches about 450° C. (see NON PATENT LITERATURE 2). In addition, in the case of a lithium-ion battery using LiCoO$_2$, the positive electrode active material is thermally decomposed at about 200° C. to generate oxygen (see NON PATENT LITERATURE 3). Therefore, for the above lithium-ion battery, it is desired that the time taken for the temperature of a normal heating element around the heating element that has caused abnormal generation of heat to reach 200° C. is made as long as possible. In consideration of the time taken for passengers to escape from a vehicle or the like equipped with heating elements such as power storage cells or power storage modules, the time taken for the temperature of the surrounding normal heating element to reach 200° C. is preferably about 70 seconds or longer. As a result of experiments conducted by the present inventors, it has been found that about 70 seconds is enough for 20 passengers to get off from a 20-seater microbus, and about 40 seconds is enough to get off from an 8-seater passenger car.

[Non Patent Literature 2]

Hideki Matsumura, Kazuo Matsushima, "Occurrence Events in Safety Evaluation Test for Lithium-Ion Cells", Proceedings of Lectures at Forum of National Traffic Safety and Environment Research Laboratory, National Traffic Safety and Environment Research Laboratory, 2012, pp. 135-138

[Non Patent Literature 3]

Shinya Kitano, et al., "Thermal Behavior of Overcharged State of Lithium-Ion Cells Using LiCoO$_2$ Positive Electrode", GS Yuasa Technical Report, GS Yuasa Corporation, December 2005, Vol. 2, No. 2, pp. 18-24

From the viewpoint of the above, a heat insulator having a thermal conductivity per unit area of $300$ W/(K·m$^2$) or less and a thickness equal to or greater than $0.5$ mm and equal to or less than $10.0$ mm is used in the coolant according to the embodiment of the present disclosure. It is more preferable if the thermal conductivity per unit area of the heat insulator is lower.

Since the coolant according to the embodiment of the present disclosure is disposed between heating elements such as power storage cells or power storage modules when being used, the thickness of the coolant which does not contribute to output is preferably as small as possible, in order to increase the energy density. The heat insulator 11 is also preferably thin in order to decrease the thickness of the coolant 10.

When the thickness of the heat insulator is equal to or greater than about $0.5$ mm, the strength of the coolant 10 can be sufficient. In addition, when the thickness of the heat insulator is equal to or less than $10.0$ mm, the energy density of a power storage pack including the coolant 10 can be increased. From these viewpoints, the thickness of the heat insulator is preferably equal to or greater than $0.5$ mm and equal to or less than $5.0$ mm, and more preferably equal to or greater than $0.5$ mm and equal to or less than $2.0$ mm.

When the thermal conductivity per unit area of the heat insulator 11 is equal to or less than $300$ W/(K·m$^2$), the coolant 10 can exhibit excellent cooling performance and heat insulation performance. When the thermal conductivity per unit area of the heat insulator 11 is lower, the coolant 10 can exhibit more excellent heat insulation performance. Thus, the thermal conductivity per unit area of the heat insulator 11 is preferably equal to or less than 100 W/(K·m$^2$) and more preferably equal to or less than 60 W/(K·m$^2$).

The size of the coolant 10 according to the embodiment of the present disclosure is not particularly limited, and only has to be selected as appropriate in accordance with the sizes of the heating elements such as power storage cells or power storage modules disposed adjacent thereto.

Normally, the heating elements have a plate shape, and thus the coolant 10 only has to be a coolant having main surfaces with a size substantially equal to or slightly larger than the size of each main surface of the heating elements.

(Enclosure)

The enclosure 13 is formed, for example, by joining two sheet members having a substantially rectangular shape in a liquid-tight manner by a known method such as adhesion, welding, or melt adhesion. Each sheet member is preferably obtained by laminating synthetic resin films on both surfaces of a metal sheet. The enclosure 13 is formed, for example, by overlaying the surfaces, of the sheet members, on which the synthetic resin films are laminated, on each other and heat-fusing the sheet members.

Examples of the metal forming the metal sheet include aluminum, aluminum alloys, copper, and copper alloys, and any metal can be selected as necessary.

Examples of the synthetic resin forming the synthetic resin film include polyolefins such as polyethylene and polypropylene, polyesters such as polybutylene terephthalate and polyethylene terephthalate, and polyamides such as nylon 6 and nylon 6,6, and any synthetic resin can be selected as necessary.

<Power Storage Pack>

A power storage pack is mounted on a vehicle such as an electric vehicle or a hybrid vehicle and supplies power to a load such as a motor.

In an example of a power storage pack according to an embodiment of the present disclosure, the power storage pack includes a plurality of power storage modules, each of the power storage modules includes a plurality of power storage cells, and it is sufficient that the above-described coolant according to the embodiment of the present disclosure is disposed at least between the plurality of power storage cells.

Figure 2:
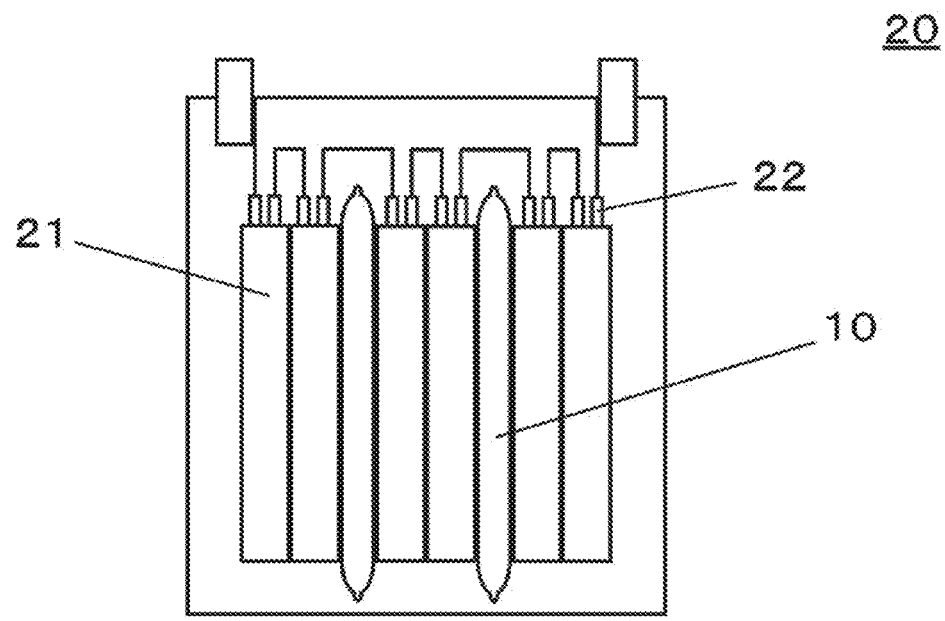
FIG. 2 is a diagram showing an outline of an example of a power storage module in a power storage pack according to an embodiment of the present disclosure.

FIG. 2 shows a schematic diagram of an example of the power storage module in the power storage pack according to the embodiment of the present disclosure. As shown in FIG. 2, a power storage module 20 includes a plurality of power storage cells 21, and includes the above-described coolants 10 according to the embodiment of the present disclosure between the plurality of power storage cells 21. In the example shown in FIG. 2, each coolant 10 is disposed at an interval of two power storage cells 21, but the arrangement of the coolants 10 can be changed as appropriate, for example, each coolant 10 may be disposed at an interval of one power storage cell 21 such that all the power storage cells 21 are not adjacent to each other, or may be disposed at an interval of three power storage cells 21.

Moreover, in the power storage pack, the coolant 10 may or may not be disposed between each power storage module. From the viewpoint of improving heat insulation performance in an emergency, the coolant 10 is preferably also disposed between each power storage module.

In another example of the power storage pack according to the embodiment of the present disclosure, the power storage pack includes a plurality of power storage modules, each of the power storage modules includes a plurality of power storage cells, and it is sufficient that the above-described coolant according to the embodiment of the present disclosure is disposed at least between the plurality of power storage modules. In this case, the coolant 10 may or may not be disposed between the power storage cells in each power storage module. From the viewpoint of improving heat insulation performance in an emergency, the coolant 10 is preferably also disposed between the power storage cells in each power storage module.

In the power storage module, the respective power storage cells 21 are connected in series or in parallel by connecting terminals of electrodes 22 to each other. In each power storage cell 21, a power storage element (not shown) only has to be interposed between a pair of power storage cell laminate sheets, and side edges of the power storage cell laminate sheets only have to be joined in a liquid-tight manner by a known method such as hot-melt adhesion.

As each power storage cell 21, for example, a secondary battery such as a lithium-ion secondary battery and a nickel hydrogen secondary battery, or a capacitor such as an electric double layer capacitor and a lithium-ion capacitor may be used, and any type can be appropriately selected as necessary. In the case where each power storage cell includes an organic electrolytic solution as an electrolytic solution, since there is a risk of catching fire due to abnormal generation of heat, the power storage pack preferably includes the coolant according to the embodiment of the present disclosure between the power storage cells or between the power storage modules.

EXAMPLES

The present disclosure will be described below in more detail by means of examples, but these examples are merely illustrative, and the coolant and the power storage pack of the present disclosure are not limited to these examples. The scope of the present invention is defined by the description of the claims and includes meaning equivalent to the description of the claims and all modifications within the scope of the claims.

Example 1

An aluminum laminate sheet having three heat-fused sides was prepared as an enclosure, and a fluorinated organic solvent was prepared as a refrigerant.

As a heat insulator, a glass wool No. 1 having a thermal conductivity per unit area of 300 W/(K·m$^2$), a main surface size of 5 cm×5 cm, a thickness of 10.0 mm, and a density of 2.3 kg/m$^3$ was prepared. As the glass wool No. 1, a glass wool obtained by mixing and molding glass fibers with a polyvinyl alcohol (binder) was used.

The refrigerant and the glass wool No. 1 were housed in the enclosure to obtain a coolant No. 1.

Example 2

As a heat insulator, a glass wool No. 2 having a thermal conductivity per unit area of 300 W/(K·m$^2$), a main surface size of 5 cm×5 cm, a thickness of 5.0 mm, and a density of 3.5 kg/m$^3$ was prepared. As the glass wool No. 2, a glass wool obtained by mixing and molding glass fibers with a polyvinyl alcohol (binder) was used.

A coolant No. 2 was obtained in the same manner as Example 1, except that the glass wool No. 2 was used instead of the glass wool No. 1 in Example 1.

Example 3

As a heat insulator, a glass wool No. 3 having a thermal conductivity per unit area of 300 W/(K·m$^2$), a main surface size of 5 cm×5 cm, a thickness of 0.5 mm, and a density of 10 kg/m$^3$ was prepared. As the glass wool No. 3, a glass wool obtained by mixing and molding glass fibers with a polyvinyl alcohol (binder) was used.

A coolant No. 3 was obtained in the same manner as Example 1, except that the glass wool No. 3 was used instead of the glass wool No. 1 in Example 1.

Example 4

As a heat insulator, a glass wool No. 4 having a thermal conductivity per unit area of 100 W/(K·m$^2$), a main surface size of 5 cm×5 cm, a thickness of 10.0 mm, and a density of 5.2 kg/m$^3$ was prepared. As the glass wool No. 4, a glass wool obtained by mixing and molding glass fibers with a polyvinyl alcohol (binder) was used.

A coolant No. 4 was obtained in the same manner as Example 1, except that the glass wool No. 4 was used instead of the glass wool No. 1 in Example 1.

Example 5

As a heat insulator, a glass wool No. 5 having a thermal conductivity per unit area of 100 W/(K·m$^2$), a main surface size of 5 cm×5 cm, a thickness of 5.0 mm, and a density of 7.6 kg/m$^3$ was prepared. As the glass wool No. 5, a glass wool obtained by mixing and molding glass fibers with a polyvinyl alcohol (binder) was used.

A coolant No. 5 was obtained in the same manner as Example 1, except that the glass wool No. 5 was used instead of the glass wool No. 1 in Example 1.

Example 6

As a heat insulator, a glass wool No. 6 having a thermal conductivity per unit area of 100 W/(K·m$^2$), a main surface size of 5 cm×5 cm, a thickness of 0.5 mm, and a density of 15 kg/m$^3$ was prepared. As the glass wool No. 6, a glass wool obtained by mixing and molding glass fibers with a polyvinyl alcohol (binder) was used.

A coolant No. 6 was obtained in the same manner as Example 1, except that the glass wool No. 6 was used instead of the glass wool No. 1 in Example 1.

Example 7

As a heat insulator, a glass wool No. 7 having a thermal conductivity per unit area of 60 W/(K·m$^2$), a main surface size of 5 cm×5 cm, a thickness of 10.0 mm, and a density of 7.6 kg/m$^3$ was prepared. As the glass wool No. 7, a glass wool obtained by mixing and molding glass fibers with a polyvinyl alcohol (binder) was used.

A coolant No. 7 was obtained in the same manner as Example 1, except that the glass wool No. 7 was used instead of the glass wool No. 1 in Example 1.

Example 8

As a heat insulator, a glass wool No. 8 having a thermal conductivity per unit area of 60 W/(K·m$^2$), a main surface size of 5 cm×5 cm, a thickness of 5.0 mm, and a density of 14.2 kg/m$^3$ was prepared. As the glass wool No. 8, a glass wool obtained by mixing and molding glass fibers with a polyvinyl alcohol (binder) was used.

A coolant No. 8 was obtained in the same manner as Example 1, except that the glass wool No. 8 was used instead of the glass wool No. 1 in Example 1.

Example 9

As a heat insulator, a glass wool No. 9 having a thermal conductivity per unit area of 60 W/(K·m$^2$), a main surface size of 5 cm×5 cm, a thickness of 2.0 mm, and a density of 17 kg/m$^3$ was prepared. As the glass wool No. 9, a glass wool obtained by mixing and molding glass fibers with a polyvinyl alcohol (binder) was used.

A coolant No. 9 was obtained in the same manner as Example 1, except that the glass wool No. 9 was used instead of the glass wool No. 1 in Example 1.

Example 10

As a heat insulator, a glass wool No. 10 having a thermal conductivity per unit area of 60 W/(K·m$^2$), a main surface size of 5 cm×5 cm, a thickness of 0.5 mm, and a density of 24 kg/m$^3$ was prepared. As the glass wool No. 10, a glass wool obtained by mixing and molding glass fibers with a polyvinyl alcohol (binder) was used.

A coolant No. 10 was obtained in the same manner as Example 1, except that the glass wool No. 10 was used instead of the glass wool No. 1 in Example 1.

Comparative Example 1

As a heat insulator, a glass wool No. A having a thermal conductivity per unit area of 400 W/(K·m$^2$), a main surface size of 5 cm×5 cm, a thickness of 1.0 mm, and a density of 3.5 kg/m$^3$ was prepared. As the glass wool No. A, a glass wool obtained by mixing and molding glass fibers with a polyvinyl alcohol (binder) was used.

A coolant No. A was obtained in the same manner as Example 1, except that the glass wool No. A was used instead of the glass wool No. 1 in Example 1.

Comparative Example 2

As a heat insulator, a glass wool No. B having a thermal conductivity per unit area of 300 W/(K·m$^2$), a main surface size of 5 cm×5 cm, a thickness of 15.0 mm, and a density of 1.7 kg/m$^3$ was prepared. As the glass wool No. B, a glass wool obtained by mixing and molding glass fibers with a polyvinyl alcohol (binder) was used.

A coolant No. B was obtained in the same manner as Example 1, except that the glass wool No. B was used instead of the glass wool No. 1 in Example 1.

<Evaluation>

Evaluation of heat insulation performance was performed using the coolant No. 1 to coolant No. 10, the coolant No. A, and the coolant No. B.

Figure 3:
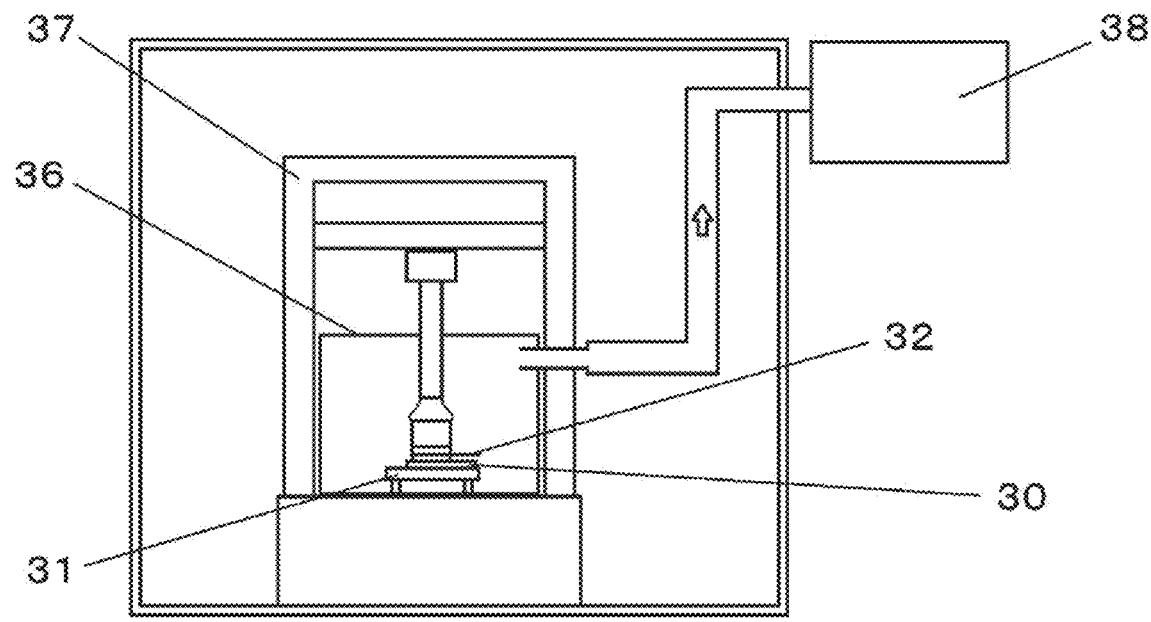
FIG. 3 is a diagram showing an outline of an apparatus used when evaluating the heat insulation performance of each of coolants produced in Examples.
Figure 4:
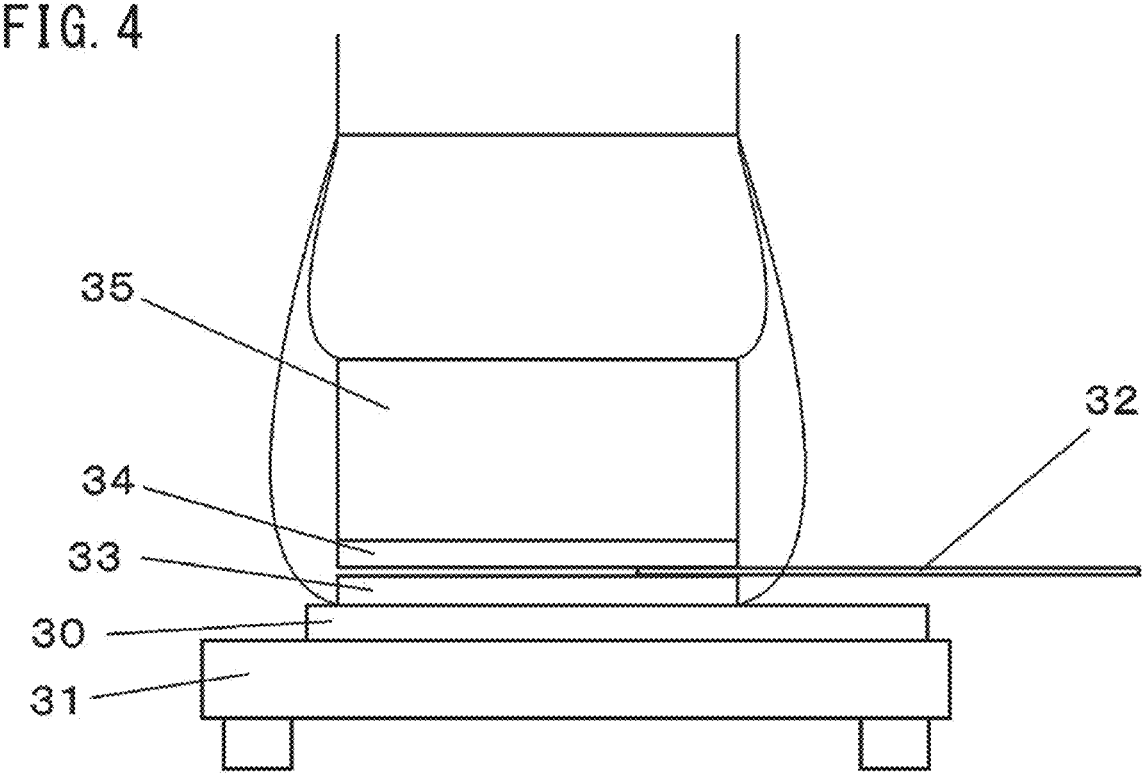
FIG. 4 is an enlarged view of the interior of a chamber shown in FIG. 3.

The evaluation of heat insulation performance was performed by bringing a coolant 30 into contact with a hot plate 31 by an autograph 37 as shown in FIG. 3. In order to eliminate the influence of convection, the hot plate 31, etc., were disposed in a chamber 36, and the interior of the chamber 36 was deaerated by a scrubber 38. FIG. 4 shows an enlarged view of the interior of the chamber 36. In the chamber 36, each coolant 30, an aluminum plate 33 having a thickness of 2 mm, a thermocouple 32, an alumina plate 34 having a thickness of 1 mm, and a metal block 35 were disposed on the hot plate 31 previously adjusted to 450° C., and the temperature change with time was measured. The metal block 35 is for preventing a failure of contact with the hot plate 31 from occurring due to expansion of the coolant 30, and a load of 1.1 kg was applied per 5 cm×5 cm.

Table 1 shows the temperatures after 40 seconds and 70 seconds from the start of measurement for each coolant.

TABLE 1

| | Thermal conductivity per unit area (W/(K·m$^2$)) | Thickness (mm) | Temperature after 40 seconds (° C.) | Temperature after 70 seconds (° C.) |
|---|---|---|---|---|
| Coolant No. 1 | 300 | 10.0 | 183 | 258 |
| Coolant No. 2 | 300 | 5.0 | 188 | 262 |
| Coolant No. 3 | 300 | 0.5 | 197 | 271 |
| Coolant No. 4 | 100 | 10.0 | 131 | 192 |
| Coolant No. 5 | 100 | 5.0 | 135 | 195 |
| Coolant No. 6 | 100 | 0.5 | 140 | 199 |
| Coolant No. 7 | 60 | 10.0 | 111 | 167 |
| Coolant No. 8 | 60 | 5.0 | 116 | 171 |
| Coolant No. 9 | 60 | 2.0 | 121 | 176 |
| Coolant No. 10 | 60 | 0.5 | 123 | 177 |
| Coolant No. A | 400 | 1.0 | 206 | 281 |
| Coolant No. B | 300 | 15.0 | 180 | 255 |

The heat insulation performance of each coolant was evaluated with an end of the coolant being open, in order to prevent a variation in the measured value due to a change in the shape of the enclosure during the evaluation. When each coolant is in a sealed state, the coolant exhibits higher heat insulation performance.

Table 1 demonstrates that, after being brought into contact with the heating element (hot plate) at 450° C., the coolant No. 1 to coolant No. 3 according to the embodiment of the present disclosure can maintain a state of 200° C. or lower for 40 seconds or longer, and the coolant No. 4 to coolant No. 10 can maintain a state of 200° C. or lower for 70 seconds or longer.

REFERENCE SIGNS LIST 10 coolant
11 heat insulator
12 refrigerant
13 enclosure
20 power storage module
21 power storage cell
22 electrode
30 coolant
31 hot plate
32 thermocouple
33 aluminum plate
34 alumina plate
35 metal block
36 chamber
37 autograph
38 scrubber

The invention claimed is:

1. A coolant comprising a refrigerant, a porous plate-shaped heat insulator, and an enclosure in which the refrigerant and the heat insulator are enclosed in a sealed state, wherein
the heat insulator has a thermal conductivity per unit area of 300 W/(K·m$^2$) or less and a thickness equal to or greater than 0.5 mm and equal to or less than 10.0 mm.

2. The coolant according to claim 1, wherein the heat insulator has a thermal conductivity per unit area of 100 W/(K·m$^2$) or less.

3. The coolant according to claim 1, wherein the heat insulator has a thermal conductivity per unit area of 60 W/(K·m$^2$) or less.

4. The coolant according to claim 1, wherein the heat insulator has a thickness equal to or greater than 0.5 mm and equal to or less than 5.0 mm.

5. The coolant according to claim 1, wherein the heat insulator has a thickness equal to or greater than 0.5 mm and equal to or less than 2.0 mm.

6. The coolant according to claim 1, wherein the heat insulator is a glass wool, a microbead porous body, or a nonwoven fabric.

7. The coolant according to claim 1, wherein
the heat insulator is a glass wool,
the refrigerant is a fluorinated organic solvent, and
the enclosure is composed of a sheet member containing aluminum or an aluminum alloy.

8. A power storage pack comprising a plurality of power storage modules, wherein
each of the power storage modules includes a plurality of power storage cells, and
the power storage pack comprises the coolant according to claim 1 at least between the plurality of power storage cells.

9. The power storage pack according to claim 8, wherein each of the power storage cells includes an organic electrolytic solution as an electrolytic solution.

10. A power storage pack comprising a plurality of power storage modules, wherein
each of the power storage modules includes a plurality of power storage cells, and
the power storage pack comprises the coolant according to claim 1 at least between the plurality of power storage modules.

11. The power storage pack according to claim 10, wherein each of the power storage cells includes an organic electrolytic solution as an electrolytic solution.

* * * * *